United States Patent
Lin

(10) Patent No.: US 8,520,144 B2
(45) Date of Patent: Aug. 27, 2013

(54) VIDEO SIGNAL PROCESSING CIRCUIT AND METHOD APPLICABLE THERETO

(75) Inventor: Hsin-I Lin, Yilan County (TW)

(73) Assignee: Novatek Microelectronics Corporation, Hsinchu (TW)

( * ) Notice: Subject to any disclaimer, the term of this patent is extended or adjusted under 35 U.S.C. 154(b) by 84 days.

(21) Appl. No.: 13/339,132

(22) Filed: Dec. 28, 2011

(65) Prior Publication Data

US 2012/0236202 A1    Sep. 20, 2012

(30) Foreign Application Priority Data

Mar. 17, 2011 (TW) .............................. 100109216 A

(51) Int. Cl.
*H04N 5/10* (2006.01)
*H04N 5/08* (2006.01)
*H04L 7/00* (2006.01)

(52) U.S. Cl.
USPC ............................ 348/533; 348/529; 348/547

(58) Field of Classification Search
USPC ......... 348/533–535, 525, 529, 547; 386/201, 386/207
See application file for complete search history.

(56) References Cited

U.S. PATENT DOCUMENTS

| | | | | | |
|---|---|---|---|---|---|
| 4,224,639 | A | * | 9/1980 | Belisomi | 348/548 |
| 4,238,769 | A | * | 12/1980 | Rzeszewski et al. | 348/529 |
| 4,319,137 | A | * | 3/1982 | Nakamura et al. | 250/556 |
| 4,745,477 | A | * | 5/1988 | Bell et al. | 348/532 |
| 4,864,403 | A | * | 9/1989 | Chao et al. | 348/614 |
| 5,784,120 | A | * | 7/1998 | Cummins et al. | 348/537 |
| 6,721,016 | B1 | * | 4/2004 | Hamajima | 348/497 |

* cited by examiner

*Primary Examiner* — Victor Kostak
(74) *Attorney, Agent, or Firm* — Rabin & Berdo, P.C.

(57) ABSTRACT

A video signal processing circuit includes: a composite sync signal generation circuit, generating a composite sync signal from a received composite video signal; a signal-noise-ratio calculation unit, generating a SNR of the composite video signal; a timing generation unit, generating a gated window based on the SNR; and a vertical sync signal separation unit, generating a vertical sync signal from the composite sync signal based on the SNR and the gated window, and dynamically adjusting a detection criterion on the vertical sync signal.

20 Claims, 9 Drawing Sheets

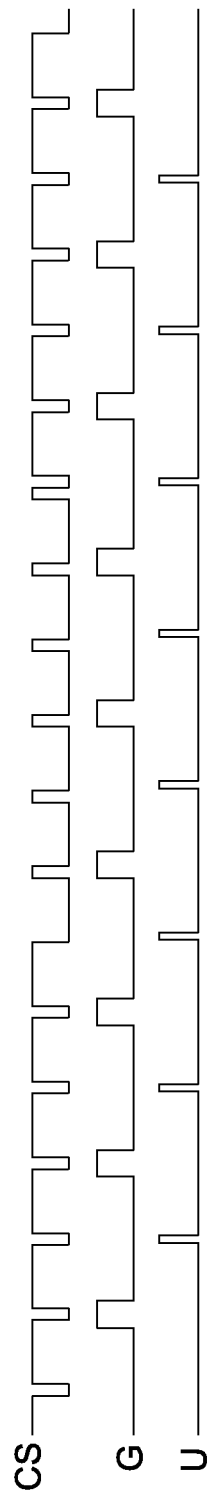

US 8,520,144 B2

VIDEO SIGNAL PROCESSING CIRCUIT AND METHOD APPLICABLE THERETO

This application claims the benefit of Taiwan application Serial No. 100109216, filed on Mar. 17, 2011, the subject matter of which is incorporated herein by reference.

TECHNICAL FIELD

The disclosure relates in general to a video signal processing circuit and a method applicable thereto.

BACKGROUND

TV has become an indispensable electronic product to people in their everydayness. Currently, digital TV has attracted even more interests due to its high resolution and delicacy, anti-interference capacity, which protects the frame quality from weather interference, and a variety of interactive functions and software upgrading functions.

TVs capable of receiving and processing external digital TV signals or TVs with an internal digital TV decoder are normally referred as digital TVs. Despite that TVs capable of receiving and processing the external digital TV signals have become more and more popular, many households still use analog TVs that can only receive analog TV signals. If users decide to continue to use the analog TV which can only receive analog TV signals, a digital TV set-top box needs to be disposed on the analog TV for converting digital TV signals into analog TV signals. By doing so, the analog TV is able to receive the digital TV signals. Through digital processing on the digital TV signals, a horizontal sync signal and a vertical sync signal may be separated from the digital TV signals.

However, if the signal-to-noise ratio (SNR) of the digital TV signal is too low, then the vertical sync signal may have a distortion problem. Thus, errors may occur in the processing of video signals. For example, the video frame may jump up and down.

SUMMARY OF THE DISCLOSURE

The disclosure is directed to a video signal processing circuit and a method applicable thereto. Through the use of a gated window, noise immunity is enhanced and the width of the gated window may be adjusted according to a signal-to-noise ratio (SNR).

The present disclosure is related to a video signal processing circuit and a method applicable thereto. A detection criterion on the vertical sync signal may be dynamically adjusted according to the SNR to improve signal processing.

According to an embodiment of the present disclosure, a video signal processing circuit including a composite sync signal generation circuit, a signal-to-noise ratio (SNR) calculation unit, a timing generation unit, and a vertical sync signal separation unit is provided. The composite sync signal generation circuit generates a composite sync signal from a received composite video signal. The SNR calculation unit generates an SNR of the composite video signal. The timing generation unit generates a gated window according to the SNR. The vertical sync signal separation unit generates a vertical sync signal from the composite sync signal according to the SNR and the gated window, and dynamically adjusts a detection criterion on the vertical sync signal according to the SNR.

According to another embodiment of the present disclosure, a video signal processing method is provided. A composite sync signal is generated from a composite video signal. An SNR of the composite video signal is generated. A gated window is generated according to the SNR. A vertical sync signal is generated from the composite sync signal according to the SNR and the gated window. A detection criterion on the vertical sync signal is dynamically adjusted according to the SNR.

It is to be understood that both the foregoing general description and the following detailed description are exemplary and explanatory only and are not restrictive of the disclosed embodiments, as claimed.

BRIEF DESCRIPTION OF THE DRAWINGS

FIG. 7C shows a composite sync signal CS, a gated window C and a signal U according to the embodiment of the present disclosure.

DETAILED DESCRIPTION OF THE DISCLOSURE

Figure 1:
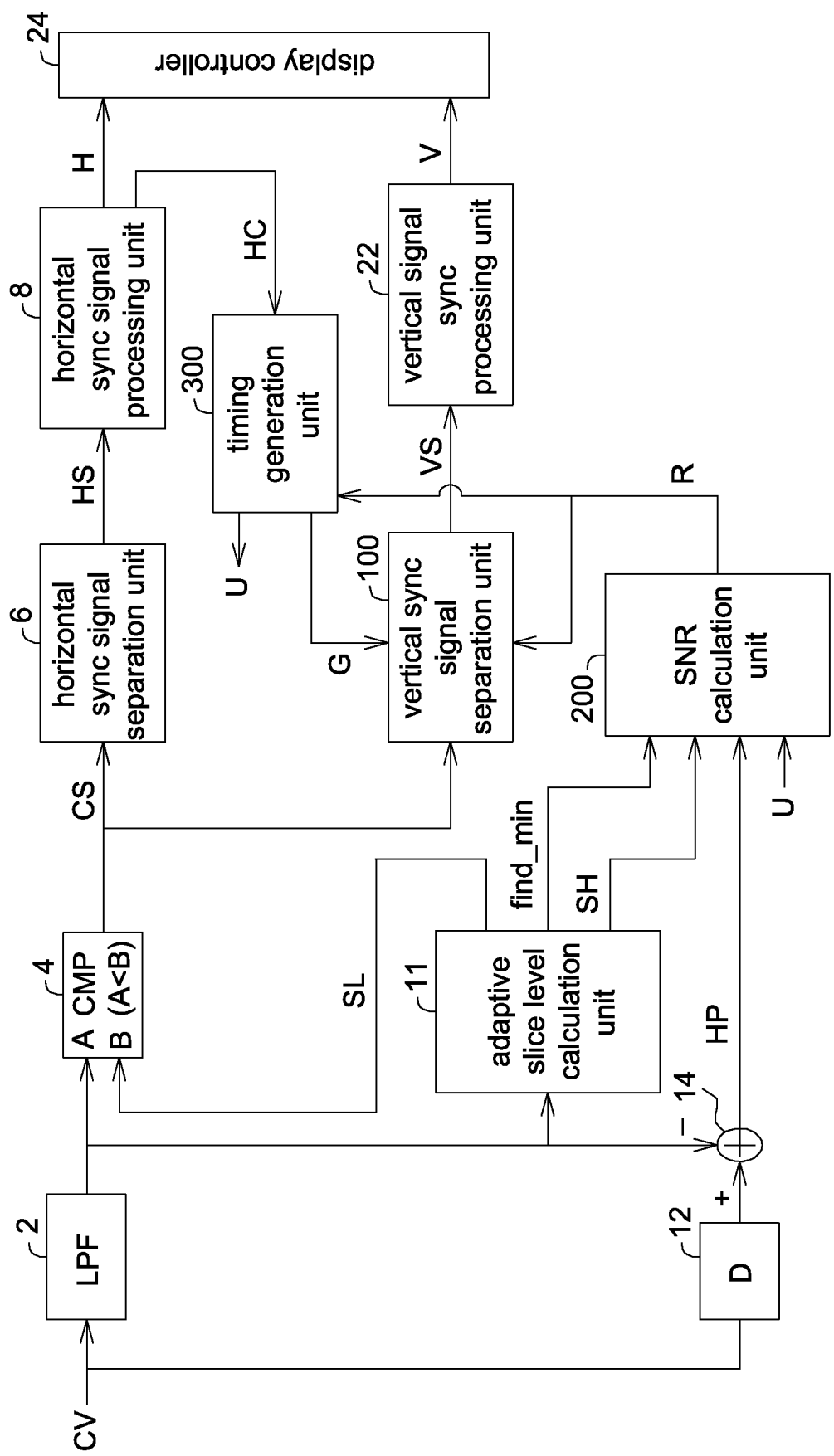
FIG. 1 shows a function block diagram of a video signal processing circuit according to an embodiment of the present disclosure.

FIG. 1 shows a function block diagram of a video signal processing circuit according to an embodiment of the present disclosure. The video signal processing circuit of the embodiment of the present disclosure is such as but not restrictively used in a digital display device, such as a digital TV or a conventional analog TV equipped with a digital TV set-top box. As indicated in FIG. 1, the video signal processing circuit of the embodiment of the present disclosure includes a low-pass filter (LPF) 2, a comparison unit (CMP) 4, a horizontal sync signal separation unit 6, a horizontal sync signal processing unit 8, an adaptive slice level calculation unit 11, a delay unit 12, an addition unit 14, a vertical signal sync processing unit 22, a display controller 24, a vertical sync signal separation unit 100, a signal-to-noise ratio (SNR) calculation unit 200 and a timing generation unit 300.

The low-pass filter 2 filters a high-frequency component off a received composite video signal CV. The adaptive slice level calculation unit generates a slice level SL according to the high-frequency-filtered composite video signal and generates a minimum detection parameter find_min and a parameter SH. The minimum detection parameter find_min indicates whether the minimum value of the high-frequency-filtered composite video signal is detected within several periods. If the minimum value is detected, then the parameter find_min is 1, otherwise the parameter find_min is 0. The parameter SH represents a sync height of the high-frequency-filtered composite video signal, which is a difference between a blank level and a sync tip. When the SNR becomes large, the parameter SH also becomes large, and vice versa.

The comparison unit 4 compares the high-frequency-filtered composite video signal with the slice level SL to generate a composite sync signal CS. For example, when the high-frequency-filtered composite video signal is higher than the slice level SL, the composite sync signal CS is logic-1. To the contrary, when high-frequency-filtered composite video signal is smaller than the slice level SL, the composite sync signal CS is logic-0.

The delay unit 12 delays the composite video signal CV. The addition unit 14 deducts the delayed composite video signal CV by the composite video signal CV to obtain a high-frequency component HP of the composite video signal CV.

The SNR calculation unit 200 generates a signal R according to the parameter find_min, the parameter SH, a signal U (generated by the timing generation unit 300) and the high-frequency component HP of the composite video signal CV, wherein the signal R represents the SNR of the composite video signal CV.

The horizontal sync signal separation unit 6 receives the composite sync signal CS to separate a horizontal sync signal HS from the composite sync signal CS. The vertical sync signal separation unit 100 separates a vertical sync signal VS from the composite sync signal CS according to a signal G (the signal G is generated by the timing generation unit 300 and is also referred as a gated window) and the signal R. The horizontal sync signal HS and the vertical sync signal VS are processed by the horizontal sync signal processing unit 8 and the vertical signal sync processing unit 22 into a horizontal signal H and a vertical signal V respectively. The vertical sync signal VS separates two adjacent video frames. For example, transition of the vertical sync signal VS to logic-0 from logic-1 indicates the end of the current video frame, and transition of the vertical sync signal VS to logic-1 from logic-0 indicates the start of a next video frame.

The timing generation unit 300 generates signals U and G according to the signals R and HC. The signal HC, generated by the horizontal sync signal processing unit 8, indicates a counting result on the horizontal sync signal HS. The signal U may be regarded as a middle position of the horizontal sync signal HS.

The display controller 24 receives the horizontal signal H and the vertical signal V, so that the display device may display a video signal accordingly.

Figure 2:
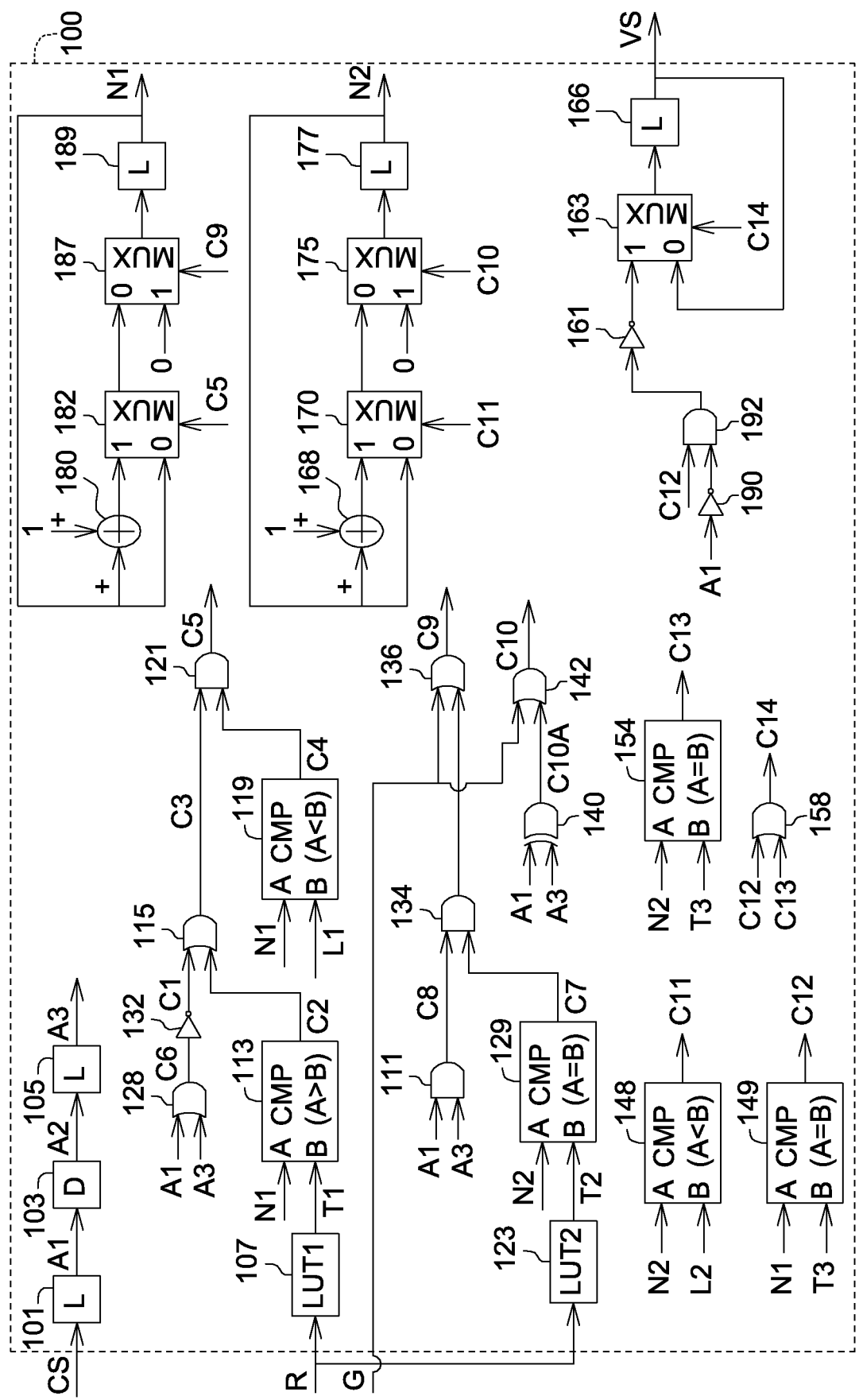
FIG. 2 shows a circuit diagram of a vertical sync signal separation unit according to the embodiment of the present disclosure.

Referring to FIG. 2, a circuit diagram of the vertical sync signal separation unit according to the embodiment of the present disclosure is shown. As indicated in FIG. 2, the vertical sync signal separation unit 100 includes latches (L) 101, 105, 166, 177 and 189, a delay unit 103, look-up tables (LUT) 107 and 123, logic gates 111, 115, 121, 128, 132, 134, 136, 140, 142, 158, 161, 190 and 192, comparison units 113, 119, 129, 148, 149, and 154, addition units 168 and 180, and multiplexers 163, 170, 175, 182, and 187.

The latch 101 latches the composite sync signal CS as a signal A1. The delay unit 103 delays the signal A1 as a signal A2. The latch 105 latches the signal A2 as a signal A3. The signal A1 may be regarded as a sample signal sampled from the composite sync signal CS. The signal A2 may be regarded as a sample signal sampled from the signal A1. The logic gate 128, such as but not limited to an OR logic gate, performs a logic operation on the signals A1 and A3 to generate a signal C6. The logic gate 132, such as but not limited to an inverter logic gate, performs a logic operation on the signal C6 to generate a signal C1. When the signal C1 is logic-1, this indicates that the composite sync signal CS has at least two consecutive logic-1 signals.

Figure 3A:
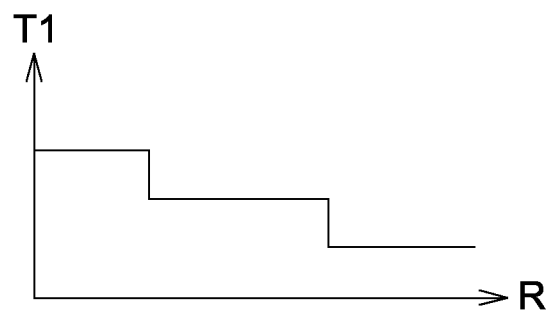
FIG. 3A and FIG. 3B respectively show relationship diagrams of T1-R and T2-R according to the embodiment of the present disclosure.
Figure 3B:
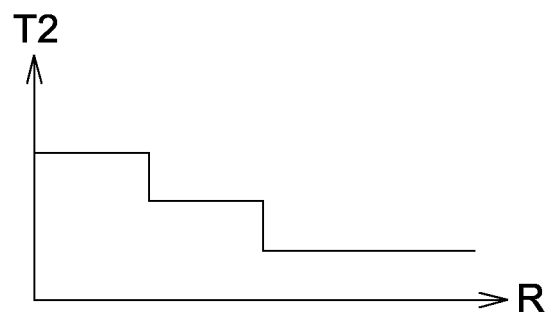
Figure 3C:
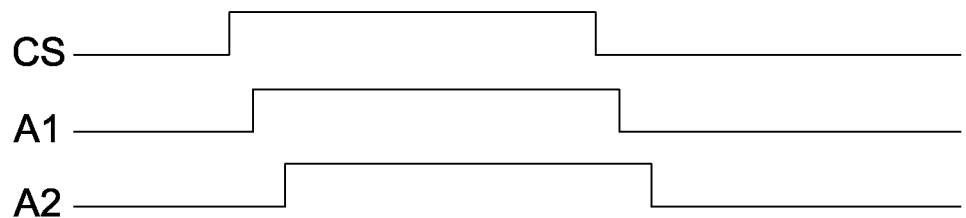
FIG. 3C~FIG. 3F show signal timing diagrams according to the embodiment of the present disclosure.

The look-up unit 107 and 123 looks up the signal R to generate a first threshold T1 and a second threshold T2 respectively. FIG. 3A and FIG. 3B respectively show relationship diagrams of T1-R and T2-R according to the embodiment of the present disclosure. As indicated in FIG. 3A and FIG. 3B, the larger the value of R (this indicates that the composite video signal CV has better quality), the smaller the thresholds T1 and T2, and vice versa. The comparison unit 113 compares the counting value N1 (generated by the latch 189) with the critical threshold T1 to generate a signal C2. For example, when the counting value N1 is larger than the critical threshold T1, the signal C2 is logic-1, and vice versa.

The logic gate 115, such as but not limited to an OR logic gate, performs a logic operation on the signals C1 and C2 to generate a signal C3. The comparison unit 119 compares the signal L1 with the counting value N1 to generate a signal C4. The signal L1 may be set as an upper limit of the counting value N1. For example, when the counting value N1 is smaller than the signal L1, the signal C4 is logic-1, and vice versa. The logic gate 121, such as but not limited to an AND logic gate, performs a logic operation on the signals C3 and C4 to generate a signal C5.

The logic gate 111, such as but not limited to an AND logic gate, performs a logic operation on the signals A1 and A3 to generate a signal C8. The comparison unit 129 compares the threshold T2 with the counting value N2 (generated by the latch 177) to generate a signal C7. For example, when the threshold T2 is equal to the counting value N2, the signal C7 is logic-1, and vice versa. The logic gate 134, such as but not limited to an AND logic gate, performs a logic operation on the signals C7 and C8, and outputs to the logic gate 136. The logic gate 136, such as but not limited to an OR logic gate, performs a logic operation on the signal G and the output signal of logic gate 134 to generate a signal C9.

The logic gate 140, such as but not limited to an EXOR logic gate, performs a logic operation on the signals A1 and A3, and outputs to the logic gate 142. The logic gate 142, such as but not limited to an OR logic gate, performs a logic operation on the signal G and the output signal of the logic gate 140 to generate a signal C10.

The comparison unit 148 compares the signal L2 with the counting value N2 to generate a signal C11. For example, when the counting value N2 is smaller than the signal L2, the signal C11 is logic-1, and vice versa. The signal L2 may be regarded as an upper limit of the counting value N2. The comparison unit 149 compares a third threshold T3 with the counting value N1 to generate a signal C12. For example, when the counting value N1 is equal to the threshold T3, the signal C12 is logic-1, and vice versa. The comparison unit 154 compares the threshold T3 with the counting value N2 to generate a signal C13. For example, when the counting value N2 is equal to the threshold T3, the signal C13 is logic-1, and vice versa. The logic gate 158, such as but not limited to an OR logic gate, performs a logic operation on the signals C12 and C13 to generate a signal C14.

The generation of the counting value N1 is elaborated below. The addition unit 180 adds the feedback counting value N1 by 1, and outputs the addition result to the multiplexer 182 which is controlled by the signal C5. For example, when the signal C5 is logic-1, the multiplexer 182 outputs the addition result of the addition unit 180, and when the signal C5 is logic-0, the multiplexer 182 outputs the counting value N1. The output of the multiplexer 182 is inputted to the multiplexer 187 which is controlled by the signal C9. For example, when the signal C9 is logic-1, the multiplexer 187 outputs logic-0, and when the signal C9 is logic-0, the multiplexer 187 outputs the output of the multiplexer 182. The latch 189 latches the output of the multiplexer 187 to generate the counting value N1. In terms of function, the latch 189 may be regarded as an up counter. That is, when the signals C5 and C9 are logic-1 and logic-0 respectively, the latch 189 is counted up. When the signal C5 is logic-0, the latch 189 keeps the counting result (that is, the value of N1 is not increased), and when the signal C9 is logic-1, the latch 189 is reset (this is because the multiplexer 187 outputs 0 to the latch 189).

The generation of the counting value N2 is elaborated below. The addition unit 168 adds the feedback counting value N2 by 1, and outputs the addition result to the multiplexer 170 which is controlled by the signal C11. For example, when the signal C11 is logic-1, the multiplexer 170 outputs the addition result of the addition unit 168, and when the signal C11 is logic-0, the multiplexer 170 outputs the counting value N2. The output of the multiplexer 170 is inputted to the multiplexer 175 which is controlled by the signal C10. For example, when the signal C10 is logic-1, the multiplexer 175 outputs logic-0, and when the signal C10 is logic-0, the multiplexer 175 outputs the output of the multiplexer 170. The latch 177 latches the output of the multiplexer 175 to generate the counting value N2. In terms of function, the latch 177 may be regarded as an up counter. That is, when the signals C11 and C10 are logic-1 and logic-0 respectively, the latch 177 is counted up, and when the signal C11 is logic-0, the latch 177 keeps the counting result (that is, the value of N2 is not increased). When the signal C10 is logic-1, the latch 177 is reset (this is because the multiplexer 175 outputs 0 to the latch 177).

The logic gate 190, such as but not limited to an inverter logic gate, performs a logic operation on the signal A1, and outputs to the logic gate 192. The logic gate 192, such as but not limited to an OR logic gate, performs a logic operation on the signal C12 and the output signal of the logic gate 190, and outputs to the logic gate 161. The logic gate 161, such as but not limited to an inverter logic gate, performs a logic operation on the output signal of the logic gate 192, and outputs to the multiplexer 163 which is controlled by the signal C14. For example, when the signal C14 is logic-1, the multiplexer 163 outputs the output of the logic gate 161, and when the signal C14 is logic-0, the multiplexer 175 outputs the vertical sync signal VS. The latch 166 latches the output of the multiplexer 163 to generate the vertical sync signal VS.

Referring to FIG. 3C~FIG. 3F, the signal timing diagrams according to the embodiment of the present disclosure are shown. As seen from FIG. 2 and FIG. 3C, the signal A1 may be regarded as a sample signal sampled from the composite sync signal CS, and the signal A2 may be regarded as a sample signal sampled from the signal A1.

Figure 3D:
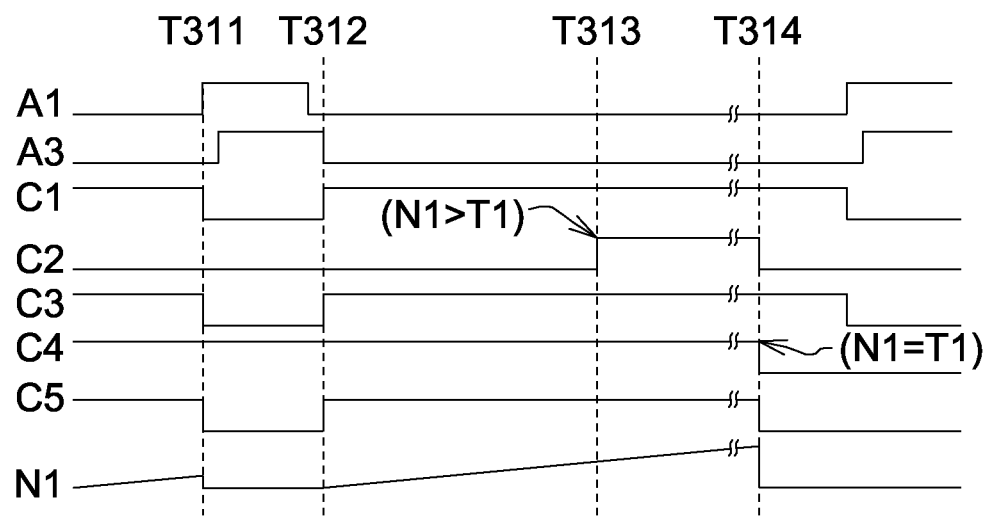

Referring to FIG. 2 and FIG. 3D. In the present embodiment of the disclosure, the signal N1 represents the number of consecutive logic-0 bits of the composite sync signal CS. That is, when the composite sync signal CS is transited to logic-1 from logic-0, the signal N1 is reset, and when the composite sync signal CS is logic-1, the signal N1 is 0. As indicated by timing T311 of FIG. 3D, the signal A1 is transited to logic-1 from logic-0, so the signal N1 is reset as 0. Besides, when the signal G is 1, the signal N1 is reset as 0.

Within the period between timings T311-T312, at least one of signals A1 and A3 is logic-1. The signal C5 is logic-0 through the operations performed by the logic gates 128, 132, 115 and 121. Thus, the multiplexer 182 outputs logic-0, and the multiplexer 187 also outputs logic-0, so that the counting value N1 (the output signal of the latch 189) is 0. This also shows that when the composite sync signal CS is logic-1, the signal N1 is at 0.

Within the period between timings T312-T313, the signals A1 and A3 are 0. The signal C6 is 0 through the operation performed by the logic gate 128; and the signal C1 is 1 through the operation performed by the logic gate 132. Meanwhile, the counting value N1 is still smaller than the T1, so the signal C2 is 0 through a comparison performed by the comparer 113; and the signal C3 is 1 through the operation performed on the signals C1 and C2 by the logic gate 115. Since the counting value N1 is still smaller than the L1, the signal C4 is 1 through the comparison result performed by the comparer 119, and the signal C5 is 1 through the operation performed on the signals C3 and C4 by the logic gate 121. The above disclosure shows that when the signal C5 is 1 (this indicates that the composite sync signal CS is transited to logic-1 from logic-0), the latch 189 is counted up so that the counting value N1 is counted up.

At timing T313, since the counting value N1 is counted up to be larger than T1, the signal C2 changes to 1 from 0 through the comparison result performed by the comparer 113. Since the transition of the signal C2 does not affect the signal C5 (because the signal C1 is 1), the counting value N1 is counted up.

At timing T314, since the counting value N1 is counted up to the L1, the signal C4 changes to 0 from 1 through the comparison result performed by the comparer 119. Since such signal transition affects the signal C5 to change to 0 from 1, the counting value N1 outputted by the latch 189 is reset as 0.

The above disclosure shows that the counting value N1 may be used for counting the number of consecutive logic-0 bits of the composite sync signal CS. Thus, the counting value N1 is reset when the composite sync signal CS is transited to logic-1 from logic-0; N1 is reset when the N1 is larger than the upper limit L1; and N1 is 0 when the composite sync signal CS is at logic-1.

Figure 3E:
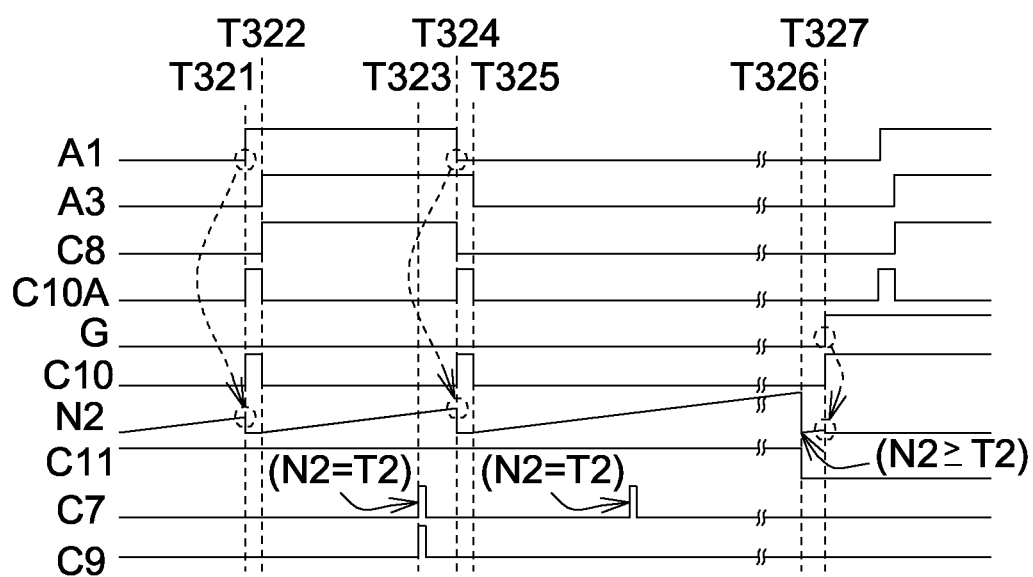

Referring to FIG. 2 and FIG. 3E. In the present embodiment of the disclosure, N2 represent the number of consecutive logic-0 bits of the composite sync signal CS or the number of consecutive logic-1 bits of the composite sync signal CS. Thus, N2 is reset when the composite sync signal CS is transited (transited to logic-1 from logic-0 or from logic-1 to logic-0); and N2 is reset when the N2 is larger than the upper limit L2. Besides, if the signal G is logic-1, then the counting value N2 is reset as 0.

At timing T321, since the signal A1 is transited (this indicates that the composite sync signal CS is transited), N2 is rest. The details are disclosed below. At timing T321, the signals A1 and A3 are logic-1 and logic-0 respectively, and the signal C10A is logic-1 through the operation performed by the logic gate 140. Through the operation performed on the signals G(0) and signal C1 0A by the logic gate 142, the signal C10 is 1, so the multiplexer 175 outputs 0 to the latch 177 and makes the counting value N2 equal to 0.

Within the period between timing T321~T322, since the signals A1 and A3 are at different logic states, the signal C10A and C10 is still logic-1, and the value of N2 is still 0.

Within the period between timing T322 and T323, the signals A1 and A3 are both logic-1, the signal C10A is logic-0 through the operation performed by the logic gate 140, and the signal C10 is 0 through the operation on the signals G(0) and C10A performed by logic gate 142. Meanwhile, the value of N2 is still smaller than the L2, and the signal C11 is 1 through the comparison result performed by the comparer 148. Since the signal C10 is 0, the multiplexer 170 selects the addition result of N2 and 1, and outputs to the multiplexer 175. Since the signal C11 is 1, the multiplexer 175 outputs the output signal of the multiplexer 170 to the latch 177. Accordingly, the latch 177 is counted up and the counting value N2 is also counted up (within this period, the value of N2 represents the number of consecutive logic-1 bits of the composite sync signal CS).

At timing T323, since the counting value N2 is equal to the T2, the comparer 129 outputs the logic-1 signal C7. Since the signals C7 and C8 are both 1, the logic gate 134 outputs logic-1, which makes the logic gate 136 outputs the logic-1 signal C9.

At timing T324, the signals A1 and A3 respectively are 0 and 1 (this indicates that the composite sync signal CS is already transited), so the logic gate 111 outputs the logic-0 signal C8, and the logic gate 140 outputs the logic-1 signal C10A. Since the signal C10A is logic-1, the logic gate 142 outputs the logic-1 signal C10 which resets the counting value N2 as 0. The situation at timing T325 is similar to that at timing T322, and the similarities are not repeated.

At timing T326, since the signal A1 has sufficient number of consecutive logic-0 bits, the counting value N2 is larger than or equal to the L2, and the comparer 148 outputs the logic-0 signal C11, which makes the latch 177 output the counting value N2 whose value is 0. Afterwards, the counting value N2 is counted up. At timing T327, since the signal G is transited to logic-1, the logic gate 142 outputs the logic-1 signal C10, and the counting value N2 is reset as 0.

FIG. 3E shows that the counting value N2 may represent the number of consecutive logic-0 bits or consecutive logic-1 bits of the composite sync signal CS.

Figure 3F:
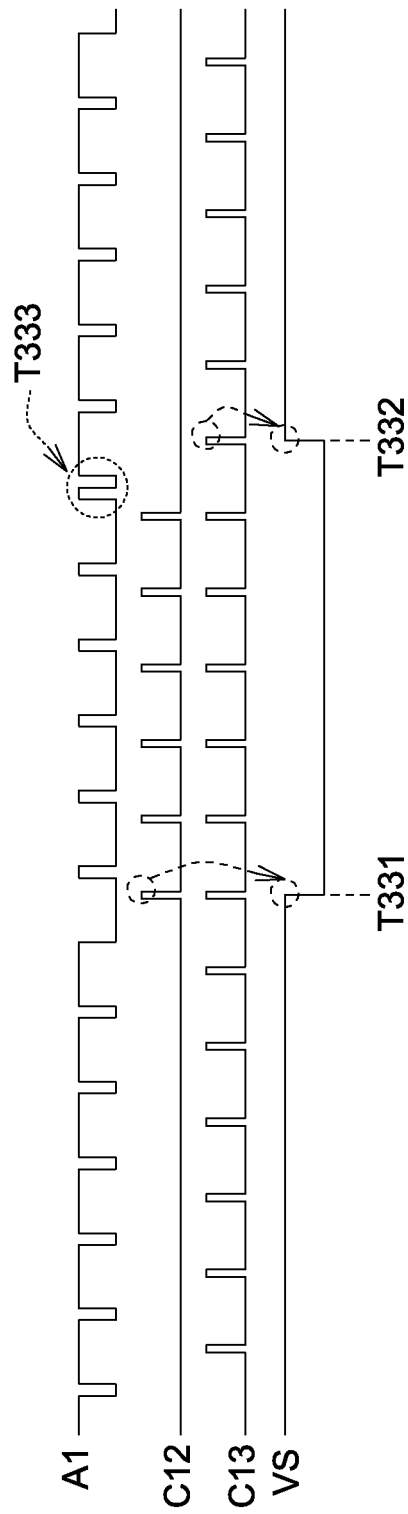

Referring to FIG. 2 and FIG. 3F. At timing T331, since the counting value N1 (which represents the number of consecutive logic-0 bits of the composite sync signal CS) is equal to the T3, the comparer 149 outputs the logic-1 signal C12. Since the signal C12 is logic-1, the logic gate 158 outputs the logic-1 signal C14. Since the signal C12 is logic-1 and the signal A1 is logic-0, the logic gate 192 outputs the logic-1 signal to the logic gate 161 which further outputs the logic-0 signal to the multiplexer 163. Since the signal C14 is logic-1, the multiplexer 163 outputs the output signal (logic-0) of the logic gate 161 to the latch 166 which further outputs the logic-0 vertical sync signal VS.

At timing T332, since the number of consecutive logic-1 bits of the signal A1 (that is, the counting value N2) is equal to the T3, the comparer 154 outputs the logic-1 signal C13. Since the signal C13 is logic-1, the logic gate 158 outputs the logic-1 signal C14. Since the signal C12 is logic-0 and the signal A1 is logic-1, the logic gate 192 outputs the logic-0 signal to the logic gate 161 which further outputs the logic-1 signal to the multiplexer 163. Since the signal C14 is logic-1, the multiplexer 163 outputs the output signal (logic-1 signal) of the logic gate 161 to the latch 166 which further outputs the logic-1 vertical sync signal VS.

When interference such as distortion occurs in the composite sync signal CS, the signal A1 is also interfered (distorted for example) such as at timing T333. FIG. 3F shows that the vertical sync signal VS generated by the present embodiment of the disclosure is not affected by the distortion of the composite sync signal CS.

The above disclosure shows that despite distortion or interference occurs in the composite sync signal CS, the present embodiment of the disclosure may stably generate the vertical sync signal VS.

Figure 4:
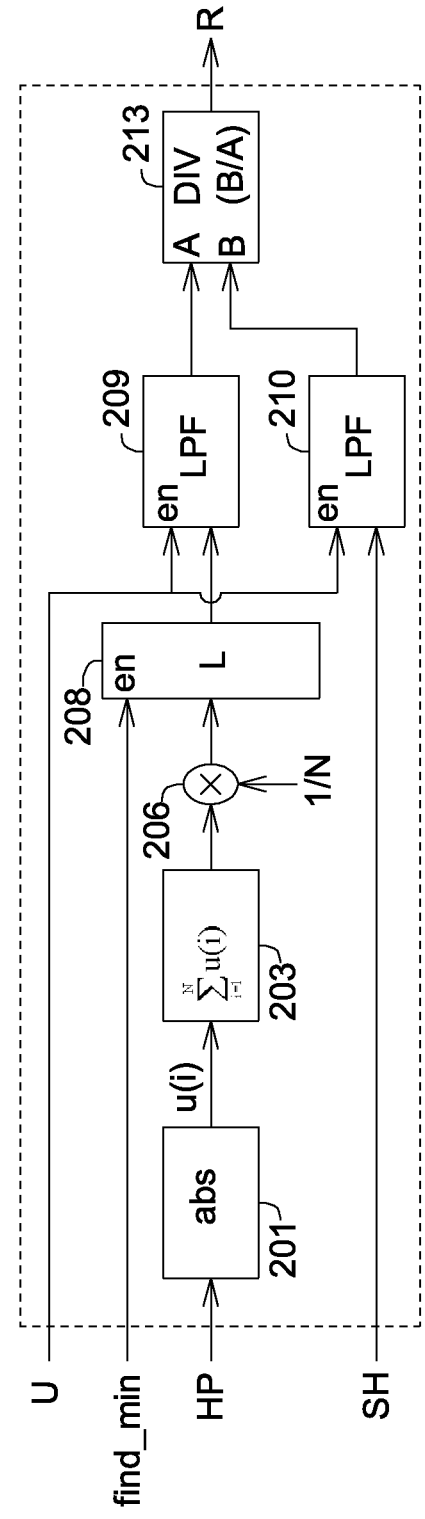
FIG. 4 shows a function block diagram of an SNR calculation unit according to the embodiment of the present disclosure.

Referring to FIG. 4, a function block diagram of the SNR calculation unit 200 according to the embodiment of the present disclosure is shown. As indicated in FIG. 4, the SNR calculation unit 200 includes an absolute value unit 201, an accumulation unit 203, a multiplication unit 206, a latch 208, low-pass filters 209 and 210 and a division unit 213.

The absolute value unit 201 takes absolute values of the high-frequency component HP of the composite video signal CV to obtain a signal u(i). The accumulation unit 203 accumulates the value of the signal u(i), and outputs the accumulation result to the multiplication unit 206. The multiplication unit 206 multiplies the accumulation result by 1/N. That is, the accumulation unit 203 and the multiplication unit 206 may be regarded as for averaging absolute values of the high-frequency component HP of the composite video signal CV. The latch 208 is controlled by the parameter find_min to latch the average value of absolute values of the high-frequency component HP of the composite video signal CV. The low-pass filters 209 and 210 are both controlled by the signal U to respectively low-pass filter the output of the latch 208 (that is, the average value of absolute values of the high-frequency component HP of the composite video signal CV) and the parameter SH. The division unit 213 divides the low-pass filtering result of the parameter SH by the output signal of the LPF 209 (that is, the low-pass filtering result of the average value of absolute values of the high-frequency component HP of the composite video signal CV) to generate the signal R which represents the SNR of the composite video signal CV.

Figure 5:
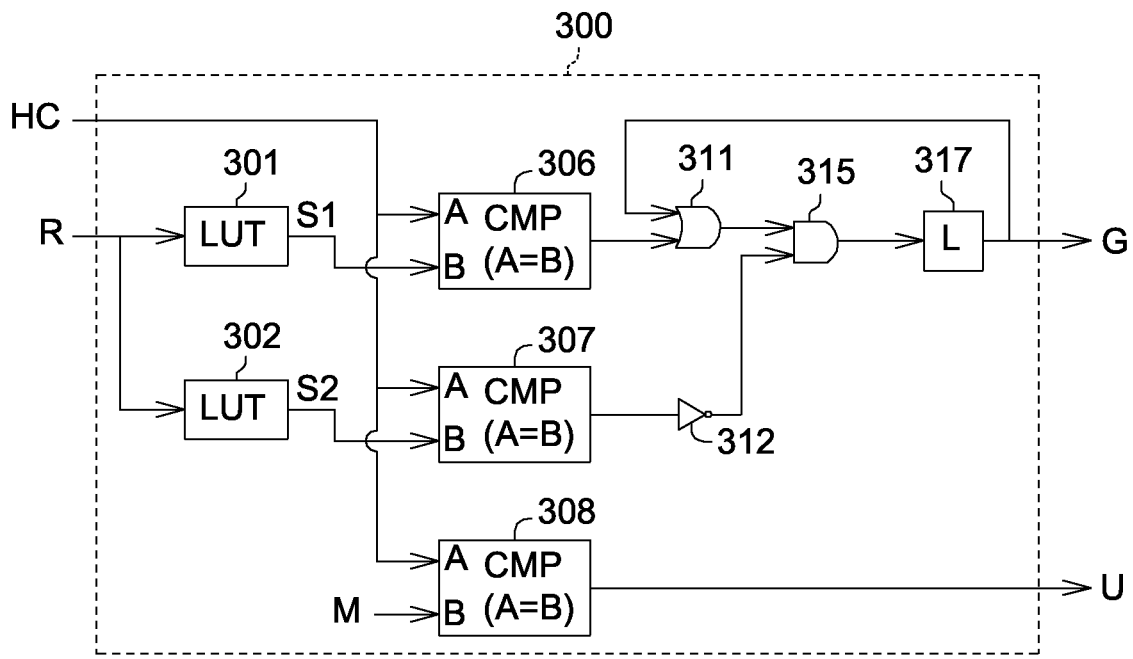
FIG. 5 shows a function diagram of a timing generation unit according to the embodiment of the present disclosure.

Referring to FIG. 5, a function diagram of the timing generation unit 300 according to the embodiment of the present disclosure is shown. As indicated in FIG. 5, the timing generation unit 300 includes look-up tables 301 and 302, comparison units 306, 307 and 308, logic gates 311, 312 and 315, and a latch 317.

Figure 6A:
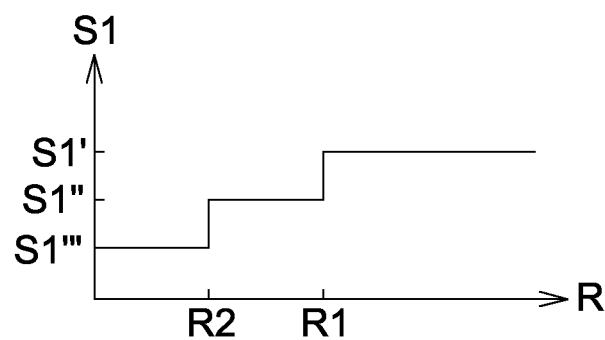
FIG. 6A and FIG. 6B respectively show relationship diagrams of S1-R and S2-R according to the embodiment of the present disclosure.
Figure 6B:
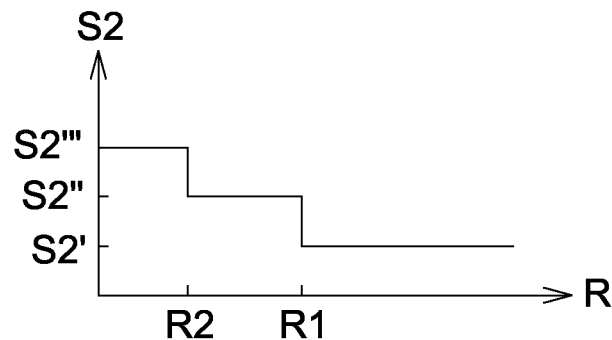
Figure 7A:
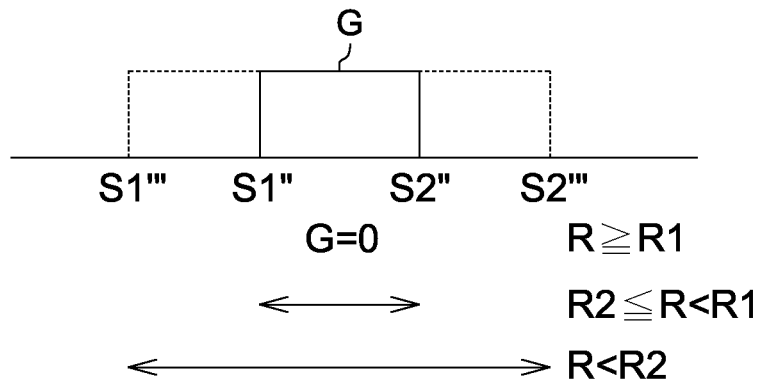
FIG. 7A shows a schematic diagram of a gated window G according to the embodiment of the present disclosure.
Figure 7B:
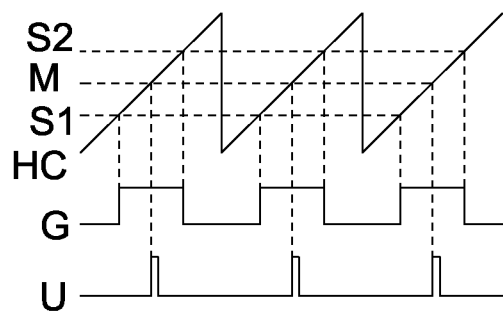
FIG. 7B shows how to generate a gated window G and a signal U from a signal HC according to the embodiment of the present disclosure.

The look-up tables 301 and 302 look up the signal R to obtain parameters S1 and S2. FIG. 6A and FIG. 6B respectively show relationship diagrams of S1-R and S2-R according to the embodiment of the present disclosure. The parameters S1 and S2 respectively represent a start point and an end point of a gated window G. FIG. 6A and FIG. 6B shows that the larger the value of R, the larger the parameter S1 and the smaller the parameter S2. To the contrary, the smaller the value of R, the smaller the parameter S1 and the larger the parameter S2. FIG. 7A shows a schematic diagram of the gated window G according to the embodiment of the present disclosure. As shown in FIG. 6A, FIG. 6B and FIG. 7A, when the signal R is larger than a threshold R1 (this indicates that the signal has better quality), the width of the gated window G equals 0 (G=S2'−S1'=0). When the signal R ranges between the thresholds R1 and R2 (this indicates that the signal has mediocre quality), the width of the gated window G equals S2"−S1". When the signal R is smaller than the R2 (this indicates that the signal has poor quality), the width of the gated window G equals S2−S1". FIG. 7B shows, in the embodiment of the present disclosure, how to generate the gated window G from a signal HC according to S1 and S2, and how to generate the signal U from the signal HC according to a parameter M. FIG. 7C shows the composite sync signal CS, the gated window C and the signal U according to the embodiment of the present disclosure.

The comparison unit 306 compares the signal HC with the parameter S1. The comparison unit 307 compares the signal HC with the parameter S2. The comparison unit 308 compares the signal HC with the parameter M to obtain the signal U. The logic gate 311, such as but is not limited to an OR logic gate, performs a logic operation on the output signal of the comparison unit 306 and the signal G, and outputs to the logic gate 315. The logic gate 312, such as but is not limited to an inverter logic gate, performs a logic operation on the output signal of the comparison unit 307, and outputs to the logic gate 315. The logic gate 315, such as but is not limited to an AND logic gate, performs a logic operation on the output signal of the logic gate 311 and the output signal of the logic gate 312, and outputs to the latch 317. The latch 317 latches the output signal of the logic gate 315 to obtain the signal G.

As indicated in FIG. 5, FIG. 6A, FIG. 6B, FIG. 7A and FIG. 7B of the present embodiment of the disclosure, the value of R (SNR) affects the setting of the gated window G. As indicated in FIG. 2, the value of G affects the signal C9 (via the logic gate 136) and the signal C10 (via the logic gate 142), the signal C9 affects the counting value N1 (via the multiplexers 182 and 187, and the latch 189), the signal C10 affects the counting value N2 (via the multiplexers 170 and 175, and the latch 177), and the counting values N1 and N2 affect the signals C12~C14 as well as the generation of the vertical sync signal VS. Thus, the present embodiment of the disclosure takes the variation in the value of R into consideration in generating the vertical sync signal VS.

Figure 8:
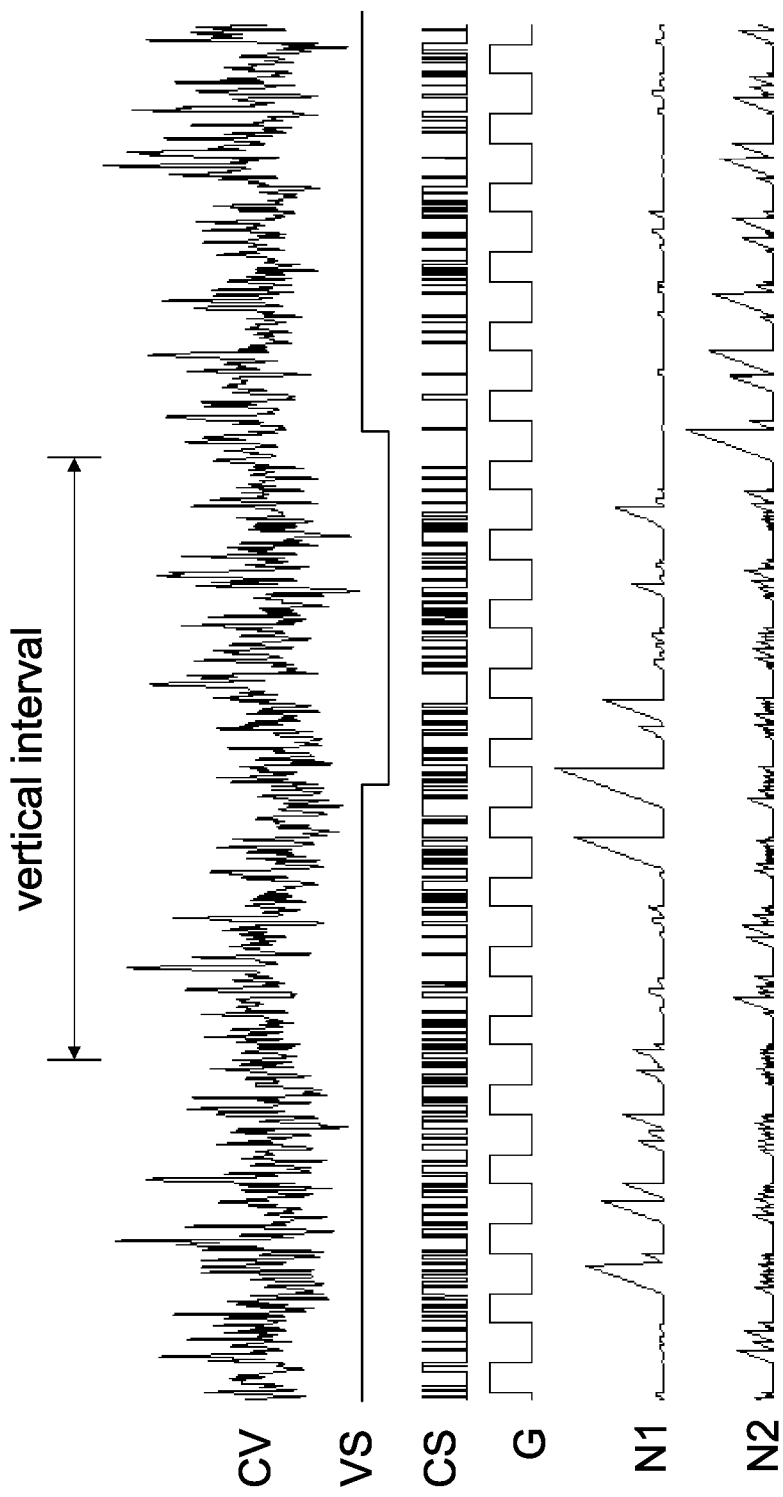
FIG. 8 shows a simulation diagram according to the embodiment of the present disclosure.

FIG. 8 shows a simulation diagram according to the embodiment of the present disclosure. As shown in FIG. 8, despite the SNR of the composite video signal CV is low, the present embodiment of the disclosure still may detect and generate the vertical sync signal VS. Thus, the present embodiment of the disclosure may detect a vertical interval which represents a vertical blank of a video frame.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A video signal processing circuit, comprising:
   a composite sync signal generation circuit for generating a composite sync signal from a received composite video signal;
   a signal-to-noise ratio (SNR) calculation unit for generating an SNR of the composite video signal;
   a timing generation unit coupled to the SNR calculation unit for generating a gated window according to the SNR; and
   a vertical sync signal separation unit coupled to the composite sync signal generation circuit, the SNR calculation unit and the timing generation unit for generating a vertical sync signal from the composite sync signal according to the SNR and the gated window and for dynamically adjusting a detection criterion on the vertical sync signal according to the SNR.

2. The video signal processing circuit according to claim 1, wherein the composite sync signal generation circuit comprises:
   a first low-pass filter for filtering the composite video signal;
   an adaptive slice level calculation unit coupled to the first low-pass filter for receiving an output signal of the first low-pass filter to generate a slice level, a minimum detection parameter and a sync height parameter of the composite video signal;
   a comparison unit coupled to the first low-pass filter and the adaptive slice level calculation unit for comparing the output signal of the first low-pass filter with the slice level to generate the composite sync signal;
   a delay unit for delaying the composite video signal; and
   an addition unit coupled to the first low-pass filter and the delay unit for obtaining a high-frequency component of the composite video signal from an output signal of the delay unit and the output signal of the first low-pass filter;
   wherein, the minimum detection parameter, the sync height parameter of the composite video signal and the high-frequency component of the composite video signal are inputted to the SNR calculation unit.

3. The video signal processing circuit according to claim 2, further comprising:
   a horizontal sync signal separation unit coupled to the composite sync signal generation circuit for receiving the composite sync signal and separating a horizontal sync signal from the composite sync signal;
   a horizontal sync signal processing unit coupled to the horizontal sync signal separation unit for processing the horizontal sync signal into a horizontal sync signal and a horizontal sync signal counting result;
   a vertical signal sync processing unit coupled to the vertical sync signal separation unit for processing the vertical sync signal as a vertical signal; and
   a display controller coupled to the horizontal sync signal processing unit and the vertical signal sync processing unit for receiving the horizontal signal and the vertical signal and displaying.

4. The video signal processing circuit according to claim 3, wherein, the timing generation unit generates the gated window and a middle position signal of the horizontal sync signal according to the SNR and the horizontal sync signal counting result, and the SNR calculation unit further receives the middle position signal of the horizontal sync signal.

5. The video signal processing circuit according to claim 4, wherein,
   the vertical sync signal separation unit samples the composite sync signal to obtain a plurality of sampling signals;
   the vertical sync signal separation unit looks up the SNR to generate a first threshold and a second threshold respectively;
   the vertical sync signal separation unit counts a number of consecutive bits of a first logic state of the composite sync signal to obtain a first counting value;
   the vertical sync signal separation unit generates the first counting value according to a comparison result between the first counting value and the first threshold, a comparison result between the first counting value and a first upper limit, the sampling signals and the gated window;
   the vertical sync signal separation unit counts the number of consecutive bits of the first logic state of the composite sync signal or a number of consecutive bits of a second logic state of the composite sync signal to obtain a second counting value;
   the vertical sync signal separation unit generates the second counting value according to a comparison result between the second counting value and the second threshold, the sampling signals and the gated window; and the vertical sync signal separation unit obtains the vertical sync signal according to a comparison result between the second counting value and a second upper limit, a comparison result between the first counting value and a third threshold, a comparison result between the second counting value and the third threshold, and at least one of the sampling signals.

6. The video signal processing circuit according to claim 5, wherein,
the vertical sync signal separation unit resets the first counting value when the composite sync signal is transited;
the vertical sync signal separation unit determines whether to reset the first counting value according to the gated window; and
the vertical sync signal separation unit resets the first counting value when the first counting value reaches the first upper limit.

7. The video signal processing circuit according to claim 6, wherein,
the vertical sync signal separation unit resets the second counting value when the composite sync signal is transited;
the vertical sync signal separation unit determines whether to reset the second counting value according to the gated window; and
the vertical sync signal separation unit resets the second counting value when the second counting value reaches the second upper limit.

8. The video signal processing circuit according to claim 7, wherein,
the vertical sync signal separation unit resets the vertical sync signal when the first counting value reaches the third threshold; and
the vertical sync signal separation unit sets the vertical sync signal as logic high when the second counting value reaches the third threshold.

9. The video signal processing circuit according to claim 8, wherein,
the SNR calculation unit generates an average of absolute values of the high-frequency component of the composite video signal from the high-frequency component of the composite video signal;
the SNR calculation unit latches the average of absolute values according to the minimum detection parameter;
the SNR calculation unit low-pass filters the average of absolute values and the sync height parameter according to the middle position signal of the horizontal sync signal; and
the SNR calculation unit generates the SNR from the low-pass filtered average of absolute values and the low-pass filtered sync height parameter.

10. The video signal processing circuit according to claim 9, wherein,
the timing generation unit looks up the SNR to obtain a gated window start parameter and a gated window end parameter;
the timing generation unit generates the gated window from the horizontal sync signal counting result according to the gated window start parameter and the gated window end parameter; and
the timing generation unit compares the horizontal sync signal the counting with a middle position parameter to generate the middle position signal of the horizontal sync signal.

11. A video signal processing method, comprising:
generating a composite sync signal from a composite video signal;
generating a signal-to-noise ratio SNR of the composite video signal;
generating a gated window according to the SNR;
generating a vertical sync signal from the composite sync signal according to the SNR and the gated window; and
dynamically adjusting a detection criterion on the vertical sync signal according to the SNR.

12. The video signal processing method according to claim 11, wherein, the step of generating the composite sync signal comprises:
filtering the composite video signal;
generating a slice level, a minimum detection parameter and a sync height parameter of the composite video signal from the filtered composite video signal;
comparing the filtered composite video signal with the slice level to generate the composite sync signal;
delaying the composite video signal; and
obtaining a high-frequency component of the composite video signal from the delayed composite video signal and the filtered composite video signal.

13. The video signal processing method according to claim 12, further comprising:
receiving the composite sync signal and separating a horizontal sync signal from the composite sync signal;
processing the horizontal sync signal as a horizontal signal and a horizontal sync signal counting result;
processing the vertical sync signal as a vertical signal; and
receiving the horizontal signal and the vertical signal and displaying.

14. The video signal processing method according to claim 13, wherein, the gated window and a middle position signal of the horizontal sync signal are generated according to the SNR and the horizontal sync signal counting result.

15. The video signal processing method according to claim 14, wherein,
a plurality of sampling signals are obtained by sampling the composite sync signal;
a first threshold and a second threshold are respectively generated by looking up the SNR;
a first counting value is obtained by counting a number of consecutive bits of a first logic state of the composite sync signal;
the first counting value is generated according to a comparison result between the first counting value and the first threshold, a comparison result between the first counting value and a first upper limit, the sampling signals and the gated window;
a second counting value is obtained by counting the number of consecutive bits of the first logic state of the composite sync signal or a number of consecutive bits of a second logic state of the composite sync signal;
the second counting value is generated according to a comparison result between the second counting value and the second threshold, the sampling signals and the gated window; and
the vertical sync signal is generated according to a comparison result between the second counting value and a second upper limit, a comparison result between the first counting value and a third threshold, a comparison result between the second counting value and the third threshold, and at least one of the sampling signals.

16. The video signal processing method according to claim 15, wherein, the first counting value is reset when the composite sync signal is transited;

whether to reset the first counting value is determined according to the gated window; and the first counting value is reset when the first counting value reaches the first upper limit.

17. The video signal processing method according to claim 16, wherein, the second counting value is reset when the composite sync signal is transited;

whether to reset the second counting value is determined according to the gated window; and the second counting value is reset when the second counting value reaches the second upper limit.

18. The video signal processing method according to claim 17, wherein, the vertical sync signal is reset when the first counting value reaches the third threshold; and the vertical sync signal is set as logic high when the second counting value reaches the third threshold.

19. The video signal processing method according to claim 18, wherein, an average of absolute values of the high-frequency component of the composite video signal is generated from the high-frequency component of the composite video signal;

the average of absolute values is latched according to the minimum detection parameter;

the average of absolute values and the sync height parameter are low-pass filtered according to the middle position signal of the horizontal sync signal; and the SNR is generated from the low-pass filtered average of absolute values and the low-pass filtered sync height parameter.

20. The video signal processing method according to claim 19, wherein, a gated window start parameter and a gated window end parameter are obtained by looking up the SNR;

the gated window is generated from the horizontal sync signal counting result according to the gated window start parameter and the gated window end parameter; and the middle position signal of the horizontal sync signal is generated by comparing the horizontal sync signal counting result with a middle position parameter.

\* \* \* \* \*